(12) United States Patent
Takahara

(10) Patent No.: US 8,326,145 B2
(45) Date of Patent: Dec. 4, 2012

(54) OPTICAL RECEIVER AND LIGHT RECEIVING METHOD

(75) Inventor: Tomoo Takahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 469 days.

(21) Appl. No.: 12/575,810

(22) Filed: Oct. 8, 2009

(65) Prior Publication Data

US 2010/0092186 A1      Apr. 15, 2010

(30) Foreign Application Priority Data

Oct. 9, 2008   (JP) ................................ 2008-263209

(51) Int. Cl.
  *H04B 10/06*    (2006.01)
  *H04B 10/08*    (2006.01)
(52) U.S. Cl. ........... 398/33; 398/202; 398/208; 398/209
(58) Field of Classification Search .................... 398/33, 398/202–204, 208–210
  See application file for complete search history.

(56) References Cited

U.S. PATENT DOCUMENTS

| 7,365,665 B2 * | 4/2008 | Pease ........................... 341/139 |
| 7,877,023 B2 * | 1/2011 | Uto .............................. 398/202 |
| 2003/0229461 A1 | 12/2003 | Fujisaku |
| 2007/0081827 A1 | 4/2007 | Ide et al. |
| 2008/0118252 A1 * | 5/2008 | Chow et al. ................... 398/202 |

FOREIGN PATENT DOCUMENTS

| JP | 2004-15587 | 1/2004 |
| JP | 2007-110231 | 4/2007 |

OTHER PUBLICATIONS

Young-Chan Jang et al., "An 8-GS/s 4-Bit 340 mW CMOS Time Interleaved Flash Analog-to-Digital Converter", IEICE Trans. Fundamentals, vol. E87-A, No. 2 Feb. 2004, pp. 350-356.
Notice of Reason for Refusal dated Sep. 11, 2012, for corresponding Japanese Application No. 2008-263209.

* cited by examiner

*Primary Examiner* — Dalzid Singh
(74) *Attorney, Agent, or Firm* — Staas & Halsey LLP

(57) ABSTRACT

An apparatus and method includes converting an optical signal that is received into an electrical signal and outputting the electrical signal, converting the electrical signal into a data signal and outputting the data signal by comparing the electrical signal with a reference voltage, monitoring the electrical signal and output monitored information, and controlling the reference voltage based on the monitored information.

11 Claims, 21 Drawing Sheets

OPTICAL RECEIVER AND LIGHT RECEIVING METHOD

CROSS-REFERENCE TO RELATED APPLICATIONS

This application is based upon and claims the benefit of priority of the prior Japanese Patent Application No. 2008-263209, filed on Oct. 9, 2008, the entire contents of which are incorporated herein by reference.

BACKGROUND

1. Field

The embodiment(s) relate to an optical receiver, a signal generating circuit, and a light receiving method.

2. Description of the Related Art

FIG. 16 illustrates a configuration example of a general optical receiver used in an optical communication system in related art. Referring to FIG. 16, the optical receiver includes a positive-intrinsic-negative photodiode (PIN-PD) 11, a transimpedance amplifier (TIA) 12, a limiting amplifier (LIA) 13, and a decision circuit (DEC) 14.

The PIN-PD 11 converts an optical signal that is received into an electrical signal and outputs the electrical signal. The TIA 12 performs current-voltage conversion. The LIA 13 amplifies the electrical signal resulting from the conversion and supplies the amplified electrical signal to the DEC 14. The DEC 14 generates a data signal in synchronization with a clock signal.

FIG. 17 illustrates a configuration example of another general optical receiver. Referring to FIG. 17, the optical receiver has a configuration in which the LIA 13 in FIG. 16 is replaced with an automatic gain control amplifier (AGC) 15.

The AGC 15 amplifies an electrical signal output from the TIA 12 and supplies the amplified electrical signal to the DEC 14. The gain in the AGC 15 is controlled so that the signal to be supplied to the DEC 14 has a constant level.

In optical receivers in the related art, an optical signal that is input is usually processed as a serial signal before the optical signal reaches the DEC 14. In addition, in order to realize a sufficient performance in response to the input optical signal having a low power, the optical receiver includes electrical amplifiers, such as the TIA 12 and the LIA 13 or the AGC 15, having higher gains.

FIG. 18 illustrates a configuration example of a coherent digital optical receiver in the related art. A modulation method, such as a dual polarization-differential quadrature phase shift keying (DP-DQPSK) or a dual polarization-quadrature phase shift keying (DP-QPSK), is adopted in such a coherent digital optical receiver in order to realize high-speed optical transmission.

Referring to FIG. 18, the digital optical receiver includes an optical hybrid 21, PIN-PDs 22-1 to 22-4, TIAs 23-1 to 23-4, AGCs 24-1 to 24-4, analog-to-digital converters (ADCs) 25-1 to 25-4, and digital signal processors (DSPs) 26-1 to 26-4. The PIN-PDs 22-1 to 22-4, the TIAs 23-1 to 23-4, the AGCs 24-1 to 24-4, the ADCs 25-1 to 25-4, and DSPs 26-1 to 26-4 are collectively referred to as a PIN-PD 22, a TIA 23, an AGC 24, an ADC 25, and a DSP 26, respectively. The same applies to elements described below.

An optical signal including two polarizations and a light oscillated from local oscillator are input into the optical hybrid 21. The optical hybrid 21 mixes the signal light with the local light for each of the two polarizations and supplies two phase components that are orthogonal to each other to two PIN-PDs 22. Specifically, the two phase components for one polarization are supplied to the PIN-PDs 22-1 and 22-2 and the two phase components for the other polarization are supplied to the PIN-PDs 22-3 and 22-4.

The operations of the PIN-PD 22, the TIA 23, and the AGC 24 are similar to those in FIG. 17. Each ADC 25 samples an electrical signal supplied from the corresponding AGC 24 in synchronization with a sampling clock signal to generate a digital data signal. Each DSP 26 uses the data signal supplied from the corresponding ADC 25 to perform signal processing.

For example, a flash ADC capable of realizing high-speed processing is used in such a coherent digital optical receiver. The flash ADC is disclosed in, for example, Young-Chan JANG et al., "An 8-GS/s 4-Bit 340 mW CMOS Time Interleaved Flash Analog-to-Digital Converter", IEICE TRANS. FUNDAMENTALS, VOL.E87-A, NO.2 February 2004, pp.350-356.

The digital optical receiver in the related art described above has the following problems.

The digital optical receiver adopting the phase modulation for the high-speed optical transmission, as in the example in FIG. 18, processes phase components in the elements from the PIN-PD to the DSP in parallel. Accordingly, it is necessary to provide the electrical amplifiers including the TIA and the AGC of a number corresponding to the number of parallel processings and, thus, a nonnegligible increase in the circuit size and the power consumption may be caused.

Furthermore, the provision of the optical hybrid causes an increase in the insertion loss, compared with an optical receiver that adopts Non Return to Zero (NRZ) and that has a bit rate of 10 Gbits/s. In addition, an avalanche photodiode (APD) is not utilized, unlike the optical receiver of 10 Gbits/s.

In consideration of the above differences, it is preferable to provide an optical preamplifier upstream of the digital optical receiver. In such a case, it is expected that an optical power higher than that in the optical receivers in the related art be input into the PIN-PD. If priority is given to a reduction in the circuit size and the power consumption with taking the above advantage, a configuration in which the TIA and the AGC having higher gains are omitted may be proposed.

FIG. 19 illustrates a configuration example of such a coherent digital optical receiver. Referring to FIG. 19, the digital optical receiver includes an optical hybrid 31, PIN-PDs 32-1 to 32-4, ADCs 33-1 to 33-4, and DSPs 34-1 to 34-4. Comparison with the configuration in FIG. 18 indicates that the TIA and the AGC are omitted in the configuration in FIG. 19.

However, since a signal output from each PIN-PD 32 is directly supplied to the corresponding ADC 33 in the configuration in FIG. 19, it is not possible to control the amplitude of the signal input into the ADC 33 in accordance with the power of the optical signal that is received.

FIG. 20 illustrates a configuration example of a flash ADC used in a digital optical receiver. Referring to FIG. 20, the ADC includes clocked comparators 41-1 to 41-4 that are arranged in parallel. Each clocked comparator 41-$i$ ($i$ is equal to any of one to four) compares an analog signal DATA with a reference voltage refi in synchronization with a clock signal CLOCK. If the comparison indicates that the level of the analog signal DATA is higher than the reference voltage refi, the clocked comparator 41-$i$ outputs a high level (H). The clocked comparator 41-$i$ otherwise outputs a low level (L). As a result, parallel data signals in synchronization with the clock signal CLOCK are generated.

FIG. 21 illustrates a configuration example of another flash ADC. Referring to FIG. 21, the ADC includes clocked comparators 41-1 to 41-4 that are arranged in parallel and resistors 42-1 to 42-3. The resistors 42-1 to 42-3 perform resistance division on a reference voltage REFERENCE to generate a reference voltage to be input into each clocked comparator 41-*i*. The operation of the clocked comparators 41-1 to 41-4 is similar to that in FIG. 20.

The ADCc illustrated in FIGS. 20 and 21 each have a configuration in which the multiple clocked comparators are arranged in parallel. The clocked comparators use different reference voltages to output the comparison results in order to perform the analog-to-digital conversion. Accordingly, the resolution of the analog-to-digital conversion depends on the number of comparators that are arranged in parallel and an increase in the number of the comparators may cause an increase in the power consumption.

As described above with reference to FIG. 19, it is necessary to arrange the multiple high-speed ADCs in parallel in the digital optical receiver. However, it is also necessary to reduce the power consumption as much as possible in terms of the function of an optical transceiver related to an optical receiver and transmitter.

FIGS. 22 and 23 each illustrate an example of the relationship between reference voltage L0 to L6 of an ADC and an analog signal that is input into the ADC.

If the AGC upstream of the ADC is omitted, the effective resolution of the ADC is reduced because the amplitude of an analog signal that is input is decreased, as illustrated by an arrow 51 in FIG. 22. In contrast, upon reception of an analog signal having an amplitude larger than estimated, as illustrated by an arrow 52 in FIG. 23, a signal output from the ADC may not follow the input analog signal and part of information may be lost.

In order to resolve the above problem, clocked comparators may be excessively provided in accordance with an estimated variation in amplitude of an input signal. However, the power consumption may undesirably be increased in such a case.

SUMMARY

According to an aspect of the invention, an apparatus and method control a reference voltage based on monitored information. The disclosed apparatus according to an embodiment includes a first converter configured to convert an optical signal that is received into an electrical signal and output the electrical signal, a second converter configured to convert the electrical signal into a data signal and output the data signal by comparing the electrical signal with a reference voltage, a monitor configured to monitor the electrical signal and output monitored information, and a controller configured to control the reference voltage based on the monitored information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
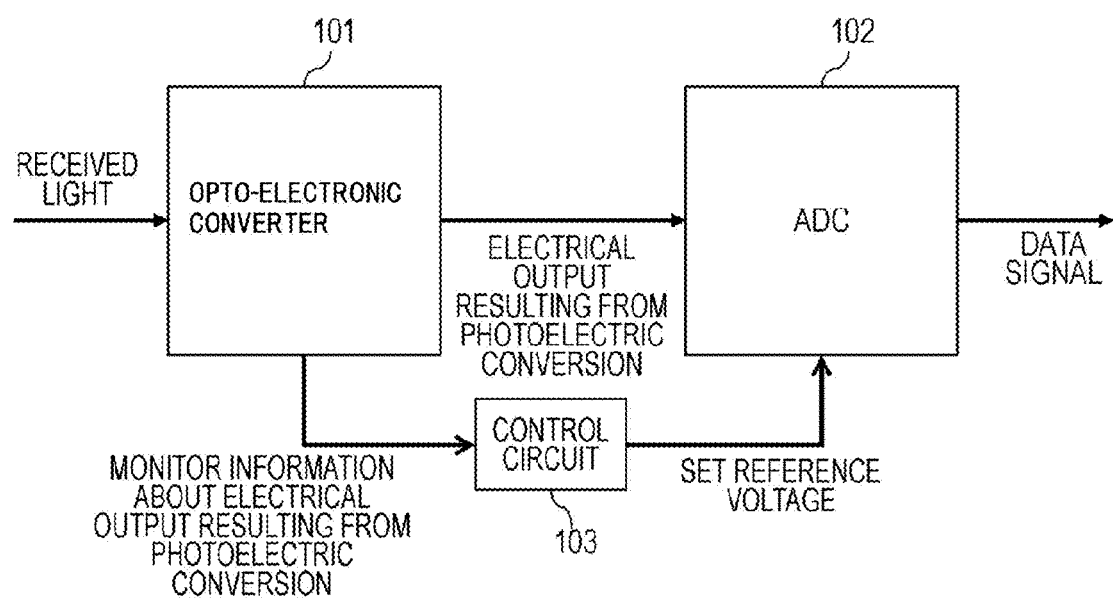
FIG. 1 is a block diagram illustrating a configuration example of a data signal generating circuit.

Reference will now be made in detail to the embodiments, examples of which are illustrated in the accompanying drawings, wherein like reference numerals refer to the like elements throughout. The embodiments are described below to explain the present invention by referring to the figures.

Embodiments of the present invention will herein be described with reference to the attached drawings.

FIG. 1 is a block diagram illustrating a configuration example of a data signal generating circuit in a digital optical receiver according to an embodiment of the present invention. Referring to FIG. 1, the data signal generating circuit includes an opto-electronic converter 101, an ADC 102, and a control circuit 103.

The opto-electronic converter 101 converts an optical signal that is input into an electrical signal by photoelectric conversion and supplies the electrical signal to the ADC 102. In addition, the opto-electronic converter 101 supplies monitor information about the electrical signal resulting from the photoelectric conversion to the control circuit 103. The control circuit 103 determines a reference voltage based on the monitor information and supplies the reference voltage to the ADC 102. The ADC 102 converts the electrical signal into a digital data signal in accordance with the input reference voltage and outputs the digital data signal.

The electrical signal resulting from the photoelectric conversion is monitored by the opto-electronic converter 101 and the reference voltage used in the ADC 102 is varied based on the monitor information, so that it is possible to control the width of the voltage input into the ADC in accordance with the variation in amplitude of the electrical signal.

Figure 2:
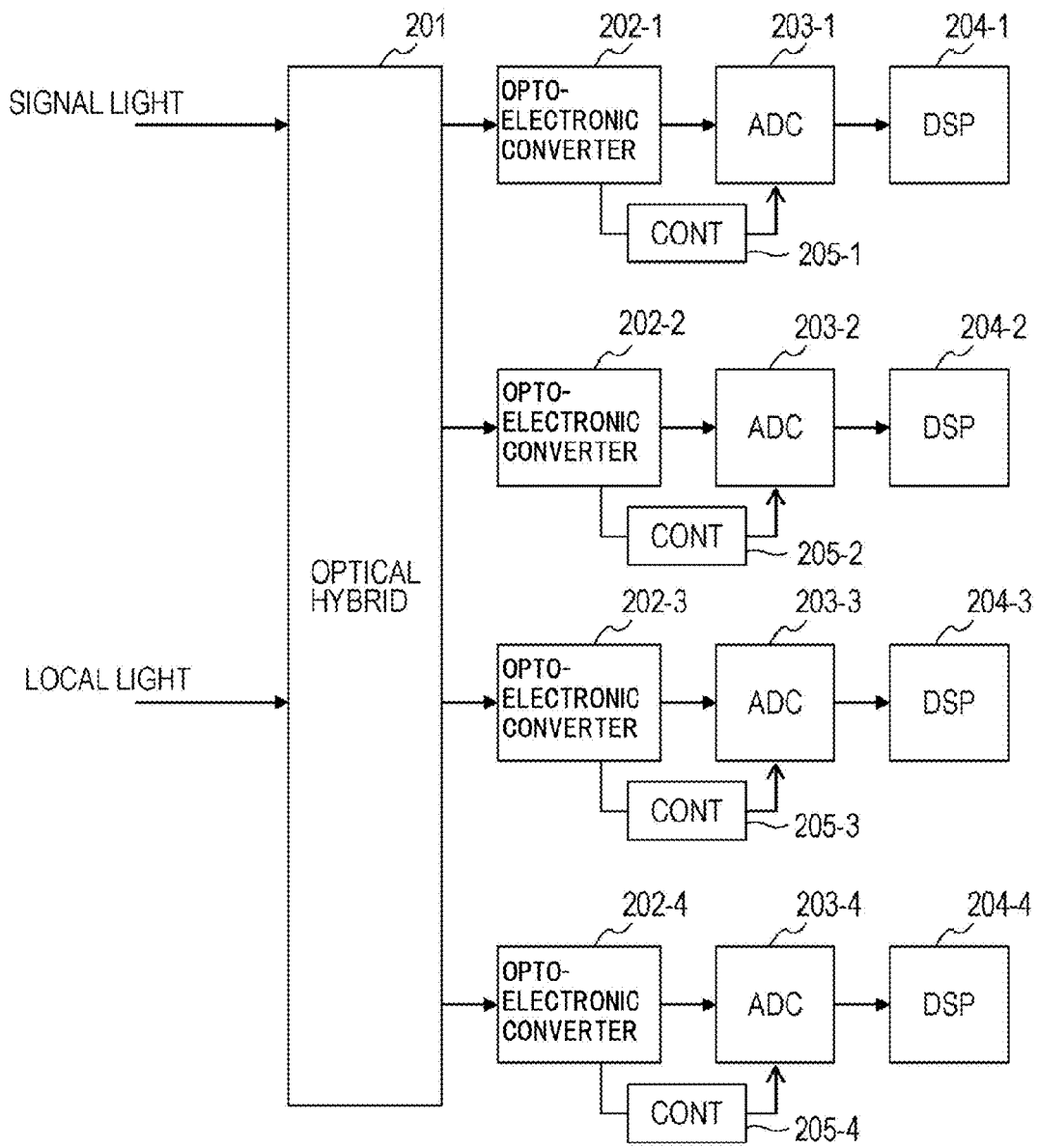
FIG. 2 illustrates a configuration example of a digital optical receiver according to an embodiment of the present invention.
Figure 19:
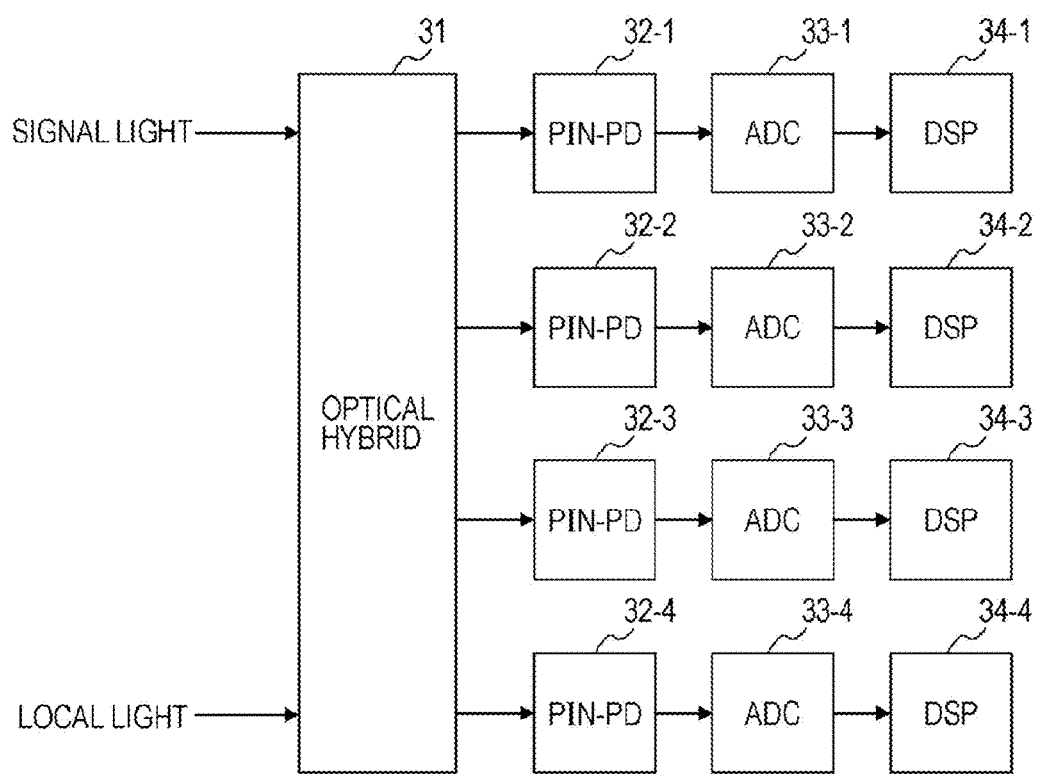
FIG. 19 illustrates a configuration example of a virtual digital optical receiver having a reduced power size and power consumption.
Figure 20:
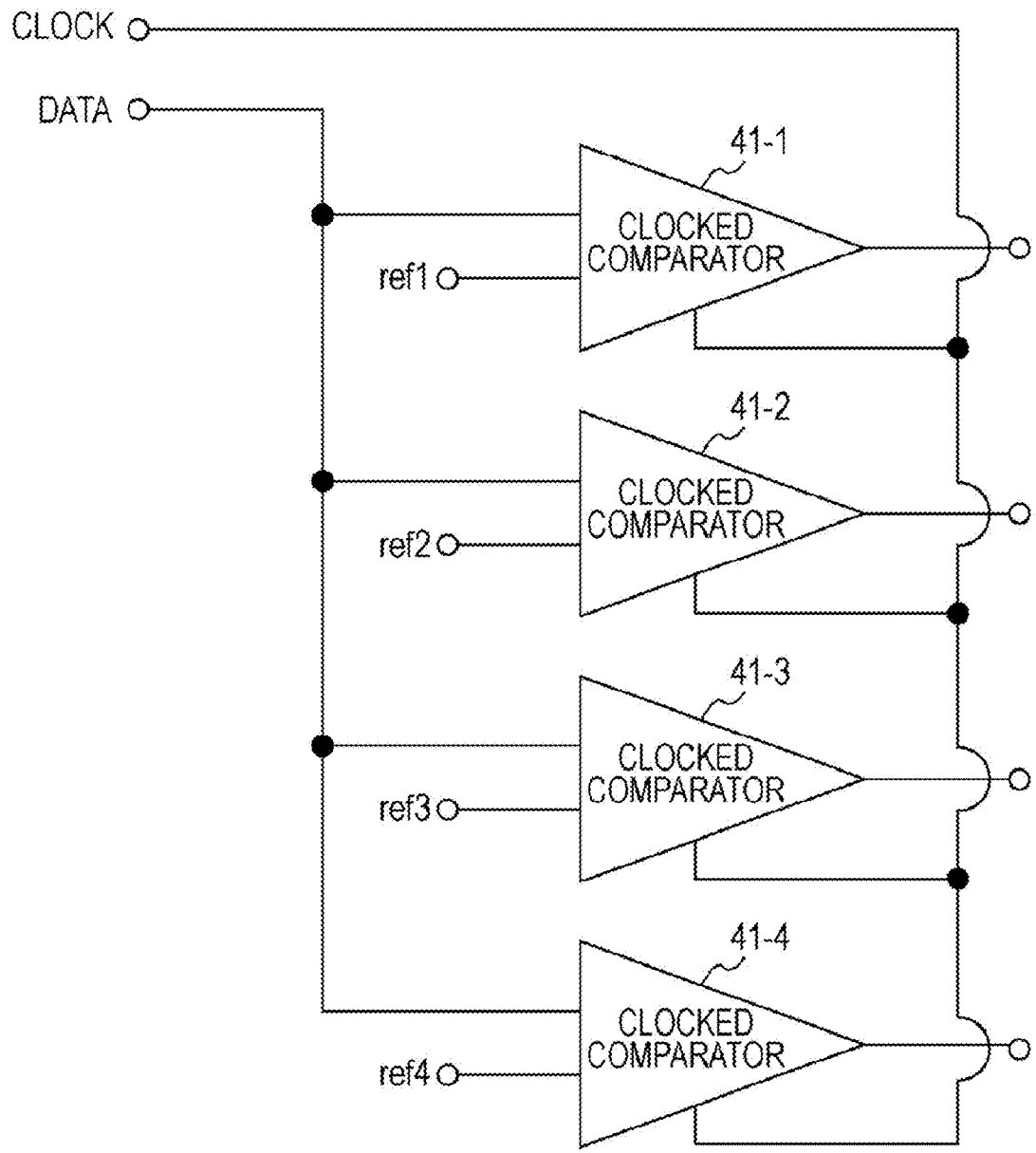
FIG. 20 illustrates a configuration example of a first flash ADC in the related art.
Figure 21:
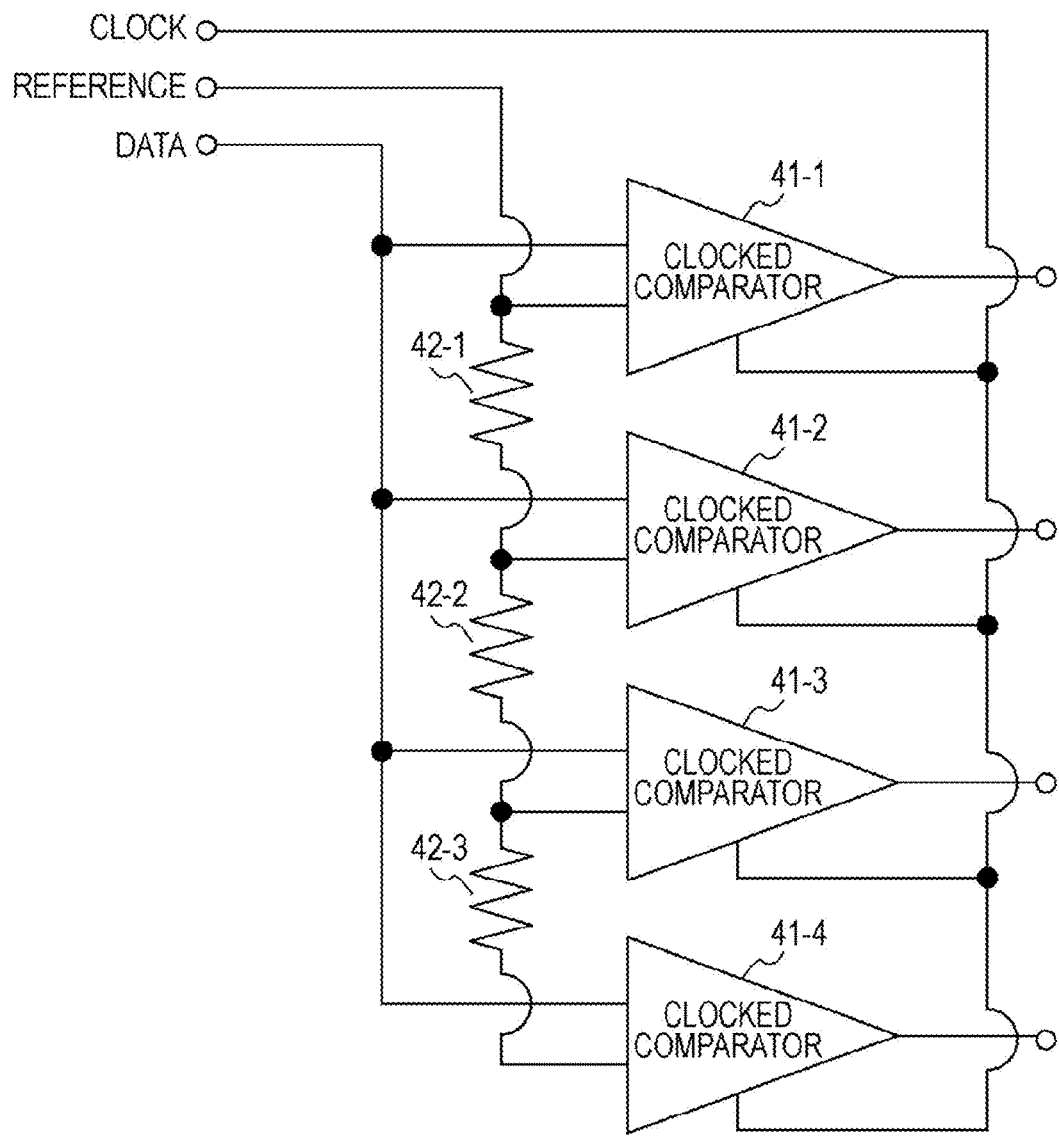
FIG. 21 illustrates a configuration example of a second flash ADC in the related art.
Figure 22:
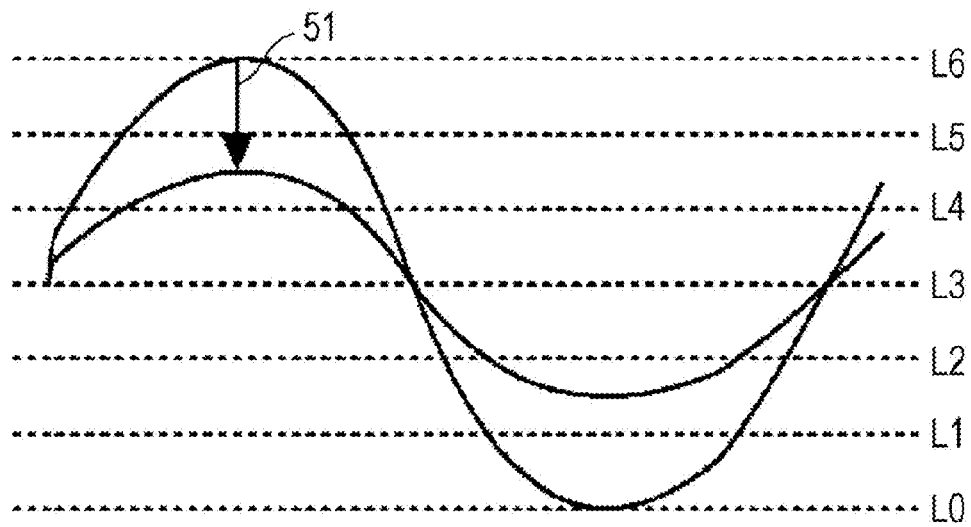
FIG. 22 is a graph illustrating a case in which an amplitude of a signal input into an ADC is decreased.
Figure 23:
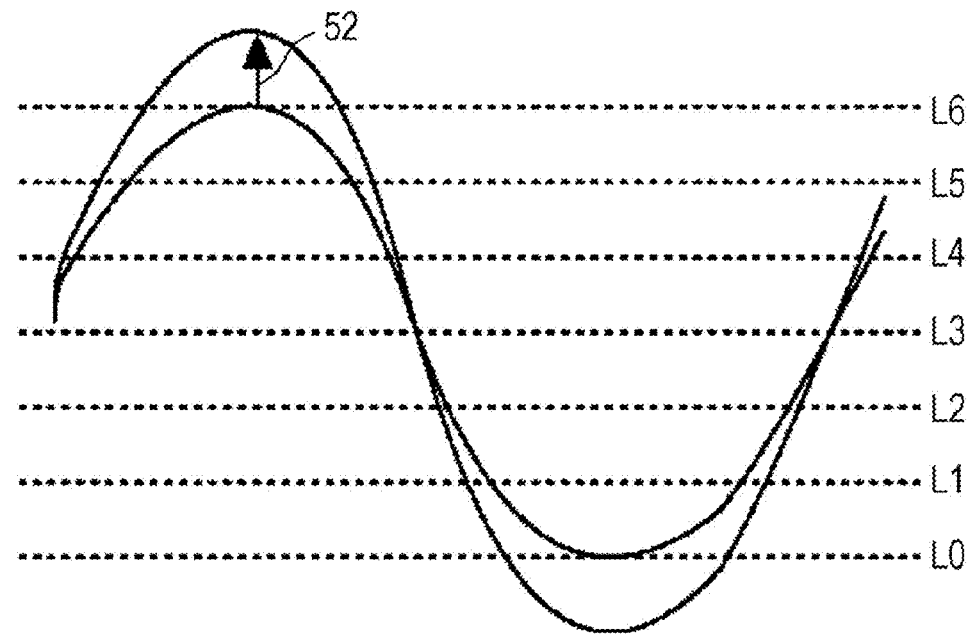
FIG. 23 is a graph illustrating a case in which the amplitude of a signal input into an ADC is increased.

FIG. 2 illustrates a configuration example in which the data signal generating circuit in FIG. 1 is adopted in the digital optical receiver in FIG. 19. Referring to FIG. 2, the digital optical receiver includes an optical hybrid 201, opto-electronic converters 202-1 to 202-4, ADCs 203-1 to 203-4, DSPs 204-1 to 204-4, and control circuits (CONTs) 205-1 to 205-4.

The opto-electronic converter 202, the ADC 203, and the CONT 205 correspond to the opto-electronic converter 101, the ADC 102, and the control circuit 103, respectively, in FIG. 1. For example, a flash ADC is used as the ADC 203.

Figure 18:
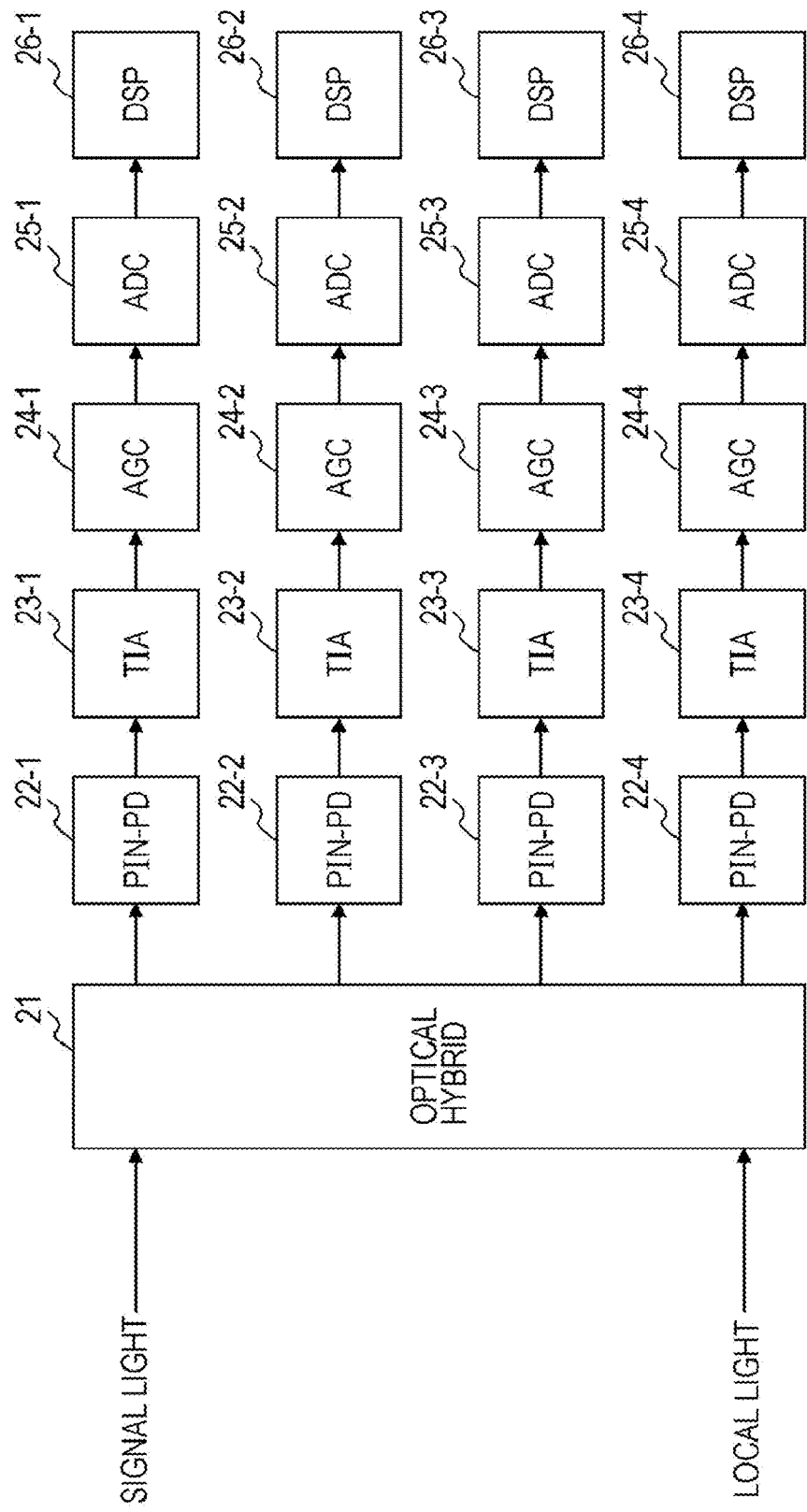
FIG. 18 illustrates a configuration example of a digital optical receiver in the related art.

The operations of the optical hybrid 201 and the DSP 204 are similar to those of the optical hybrid 21 and the DSP 26 in FIG. 18.

The opto-electronic converter 202 converts an optical signal supplied from the optical hybrid 201 into an electrical signal and supplies the electrical signal to the ADC 203. In addition, the opto-electronic converter 202 supplies monitor information about the electrical signal to the CONT 205. The CONT 205 determines a reference voltage based on the monitor information and supplies the reference voltage to the ADC 203. The ADC 203 converts the electrical signal into a digital data signal in accordance with the input reference voltage and supplies the digital data signal to the DSP 204.

Various configuration examples of the data signal generating circuit in the digital optical receiver in FIG. 2 will now be descried with reference to FIGS. 3 to 15.

Figure 3:
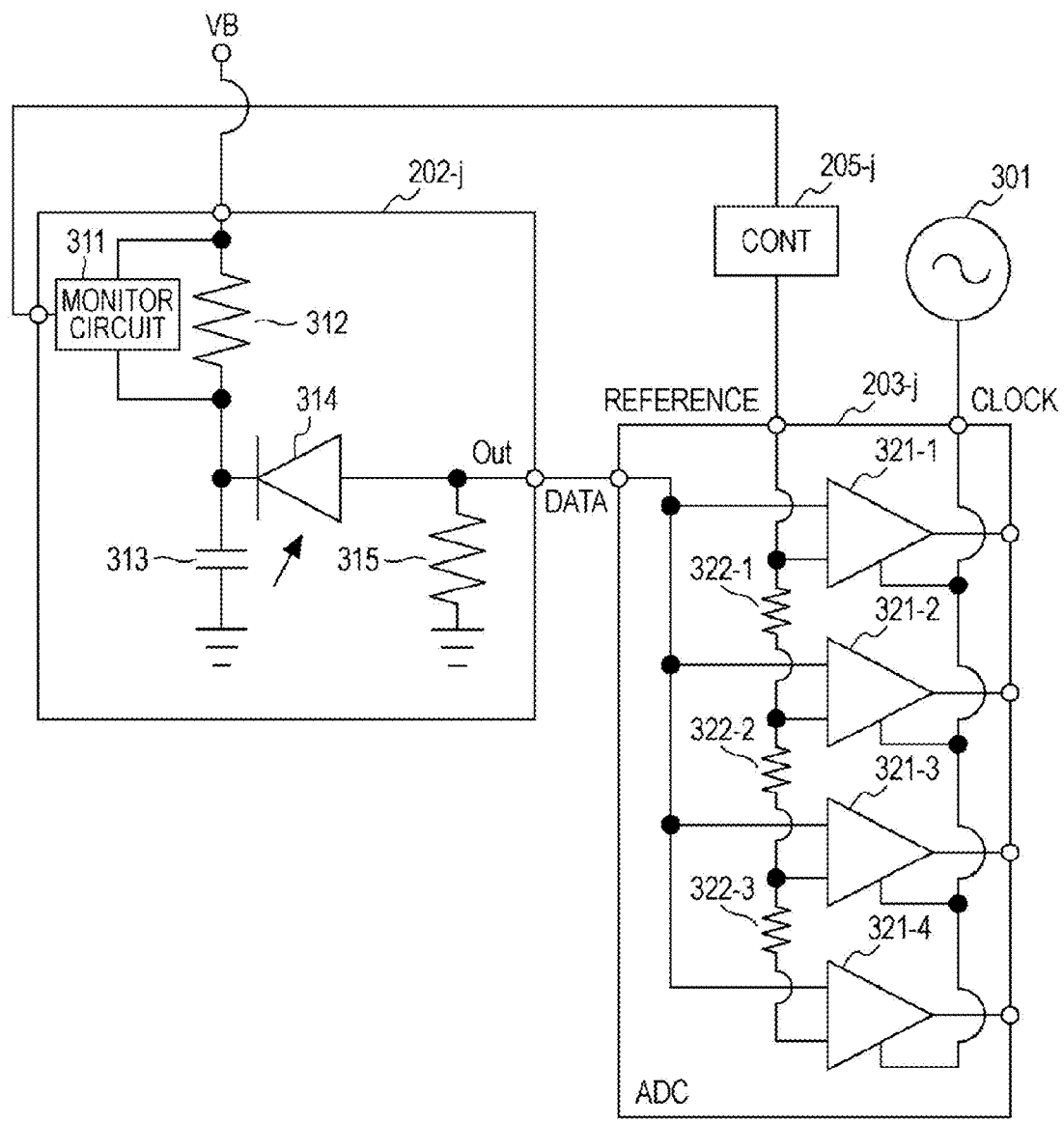
FIG. 3 illustrates another configuration example of a data signal generating circuit.

FIG. 3 illustrates a configuration example in which a current flowing through each opto-electronic converter 202-$j$ ($j$ is equal to any of one to four) is monitored. The opto-electronic converter 202-$j$ includes a monitor circuit 311, a resistor 312, a capacitor 313, a PIN-PD 314, and a load resistor 315.

A bias voltage VB is applied to one terminal of the resistor 312, and the other terminal of the resistor 312 is connected to one terminal of the capacitor 313 for stabilizing the bias voltage. The other terminal of the capacitor 313 is grounded.

The cathode of the PIN-PD 314 is connected between the resistor 312 and the capacitor 313 and the anode thereof is connected to an output terminal. The output terminal is connected to one terminal of the load resistor 315 and the other terminal of the load resistor 315 is grounded.

Upon reception of an optical signal by the PIN-PD 314, a current flows through the load resistor 315 and an analog signal DATA is supplied to an ADC 203-$j$ through the output terminal. The monitor circuit 311 is connected between both ends of the resistor 312. The monitor circuit 311 monitors the value of a current flowing through the resistor 312 to indirectly monitor the value of a current flowing through the load resistor 315. The monitor circuit 311 supplies information about the current value that is monitored to a CONT 205-$j$.

The CONT 205-$j$ determines a reference voltage REFERENCE based on the input information about the current value and applies the reference voltage REFERENCE to the ADC 203-$j$. For example, the reference voltage REFERENCE is set to a value proportional to the current value.

The ADC 203-$j$ includes clocked comparators 321-1 to 321-4 that are arranged in parallel and resistors 322-1 to 322-3. The resistors 322-1 to 322-3 perform the resistance division on the reference voltage REFERENCE to generate a reference voltage to be input into each clocked comparator 321-$i$ ($i$ is equal to any of one to four).

The clocked comparator 321-$i$ compares the analog signal DATA with the reference voltage in synchronization with a clock signal CLOCK supplied from a sampling clock source 301. If the comparison indicates that the level of the analog signal DATA is higher than the reference voltage, the clocked comparator 321-$i$ outputs a high level (H). The clocked comparator 321-$i$ otherwise outputs a low level (L). As a result, parallel data signals in synchronization with the clock signal CLOCK are generated.

Figure 4:
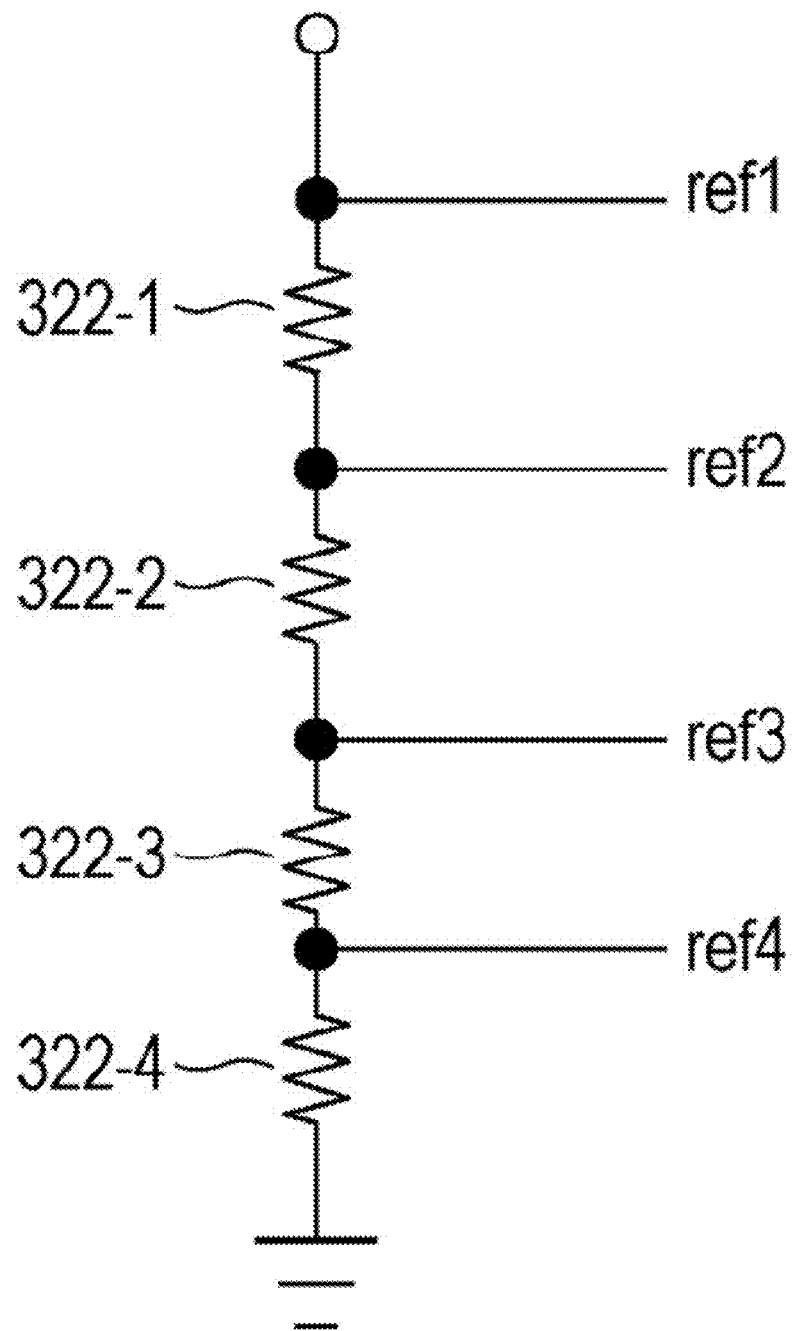
FIG. 4 illustrates resistance division of a reference voltage.

The ADC 203-$j$ actually also includes a resistor 322-4, as illustrated in FIG. 4, although the resistor 322-4 is omitted in FIG. 3. One terminal of the resistor 322-4 is connected to the resistor 322-3 and the other terminal thereof is grounded. Accordingly, the resistors 322-1 to 322-4 perform the resistance division on the reference voltage REFERENCE to generate a reference voltage refi to be input into the corresponding clocked comparator 321-$i$.

Provided that the reference voltage REFERENCE is equal to one volt and the resistors 322-1 to 322-4 have the same resistance for simplicity, the reference voltages ref1 to ref4 input into the clocked comparators 321-2 to 321-4, respectively, have the following values:

ref1=1,000 mV
ref2=750 mV
ref3=500 mV
ref4=250 mV

Provided that the resistor 312 in the opto-electronic converter 202-$j$ has a resistance of 1Ω and the amplitude of a signal between both ends of the resistor 312, detected by the monitor circuit 311, is equal to 40 mV for simplicity, a current of 40 mV flows through the load resistor 315. Provided that the load resistor 315 has a resistance of 50Ω, an amplitude Vout of the analog signal DATA has the following value:

$$V\text{out}=40\text{ mV}\times 50\Omega=2{,}000\text{ mVpp}$$

In this case, for example, setting the reference voltage REFERENCE to 1,600 mV allows the analog-to-digital conversion appropriate for the analog signal of 2,000 mVpp to be performed. Accordingly, the monitor circuit 311 supplies the detected signal amplitude 40 mV to the CONT 205-$j$ as information about the current value. The CONT 205-$j$ multiplies a proportionality constant 40 by 40 mV to obtain the reference voltage 1,600 mV.

Provided that that a voltage of 1,600 mV is applied as the reference voltage REFERENCE, the reference voltages ref1 to ref4 have the following values:

ref1=1,600 mV
ref2=1,200 mV
ref3=800 mV
ref4=400 mV

The resistors 322-1 to 322-4 may not necessarily have the same resistance.

Figure 5:
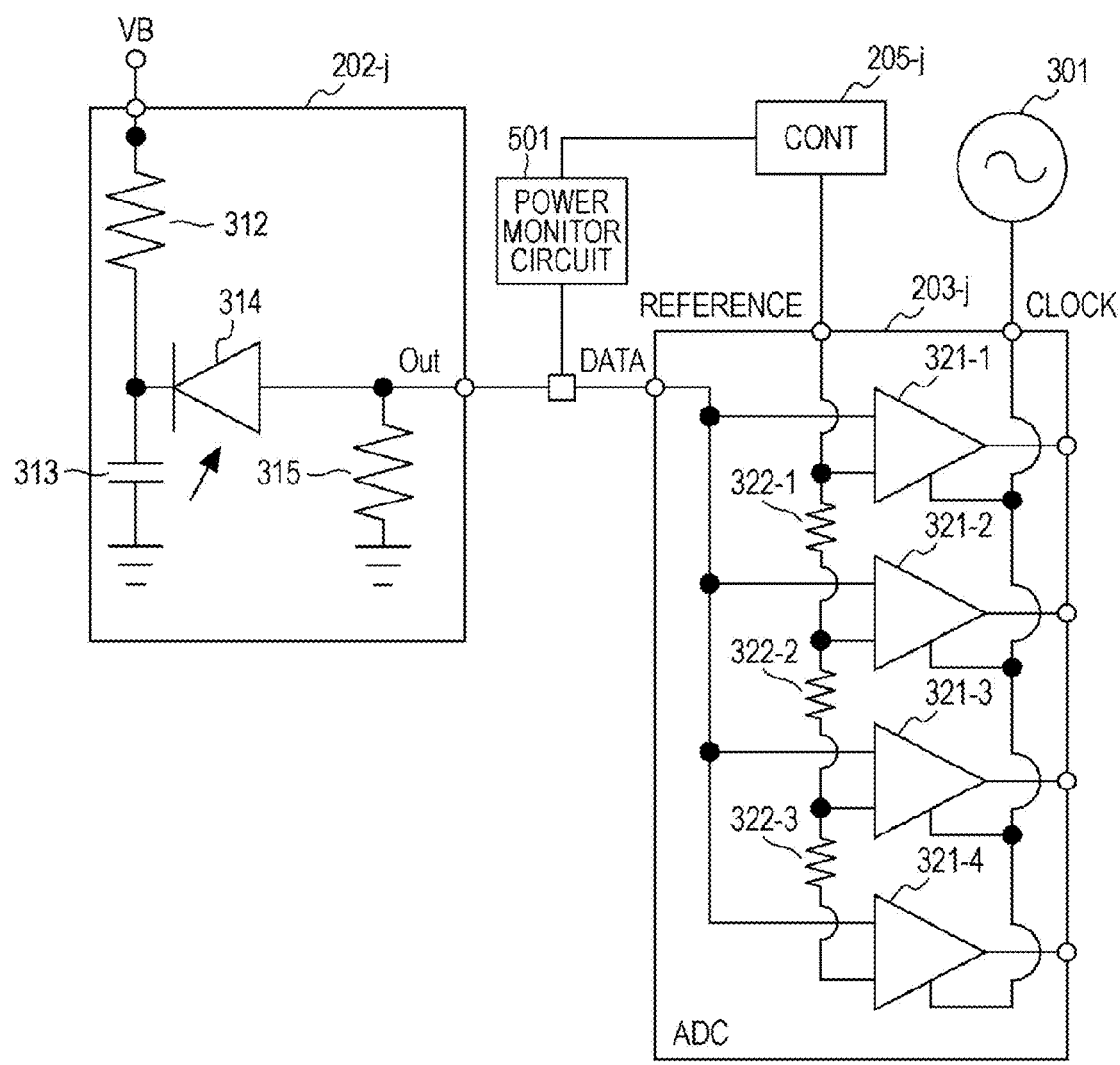
FIG. 5 illustrates another configuration example of a data signal generating circuit.

FIG. 5 illustrates a configuration example in which a power of the analog signal DATA output from the opto-electronic converter 202-$j$ is monitored. The opto-electronic converter 202-$j$ in FIG. 5 has a configuration in which the monitor circuit 311 is removed from the opto-electronic converter 202-$j$ in FIG. 3. The ADC 203-$j$ in FIG. 5 has the same configuration as in FIG. 3. While embodiment(s) are described herein as monitoring a particular condition, the present invention is not limited to monitoring any particular information. For example, the present invention may be configured to selectively monitor any information determined to be relevant to varying a reference voltage.

Referring to FIG. 5, a power monitor circuit 501 is connected to the output terminal of the opto-electronic converter 202-j to monitor the power of the analog signal DATA. The power monitor circuit 501 supplies information about the monitored power to the CONT 205-j.

The CONT 205-j determines the reference voltage REFERENCE based on the received information about the power and applies the reference voltage REFERENCE to the ADC 203-j. For example, the reference voltage REFERENCE is set to a higher value as the light power received by the PIN-PD 314 is increased.

Figure 6:
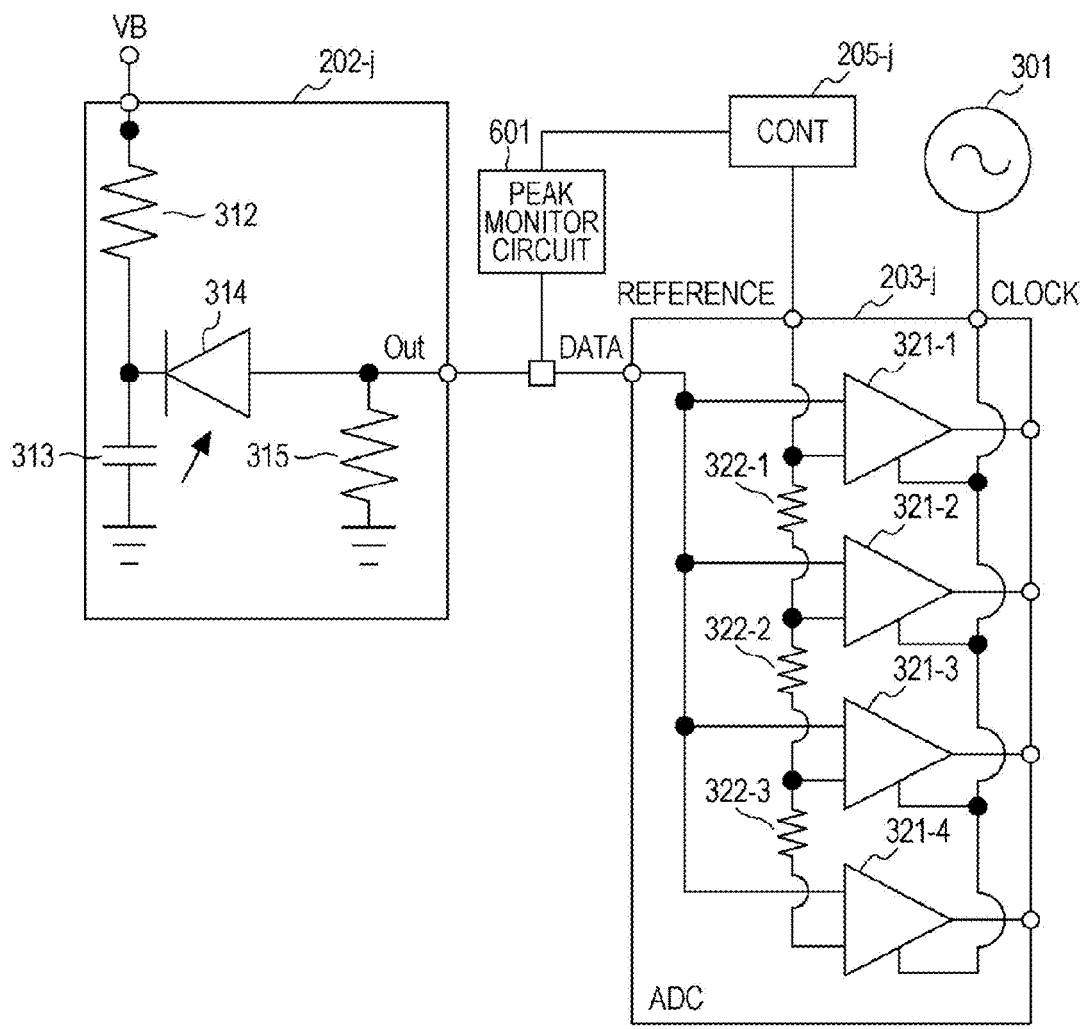
FIG. 6 illustrates a configuration example of a data signal generating circuit.

FIG. 6 illustrates a configuration example in which a peak value of the analog signal DATA output from the opto-electronic converter 202-j is monitored. The opto-electronic converter 202-j in FIG. 6 has the same configuration as in FIG. 5. The ADC 203-j in FIG. 6 has the same configuration as in FIG. 3.

Referring to FIG. 6, a peak monitor circuit 601 is connected to the output terminal of the opto-electronic converter 202-j to monitor the peak value of the analog signal DATA. The peak monitor circuit 601 supplies information about the monitored peak value to the CONT 205-j.

The CONT 205-j determines the reference voltage REFERENCE based on the received information about the peak value and applies the reference voltage REFERENCE to the ADC 203-j. For example, the reference voltage REFERENCE is set to a value proportional to the peak value.

Figure 7:
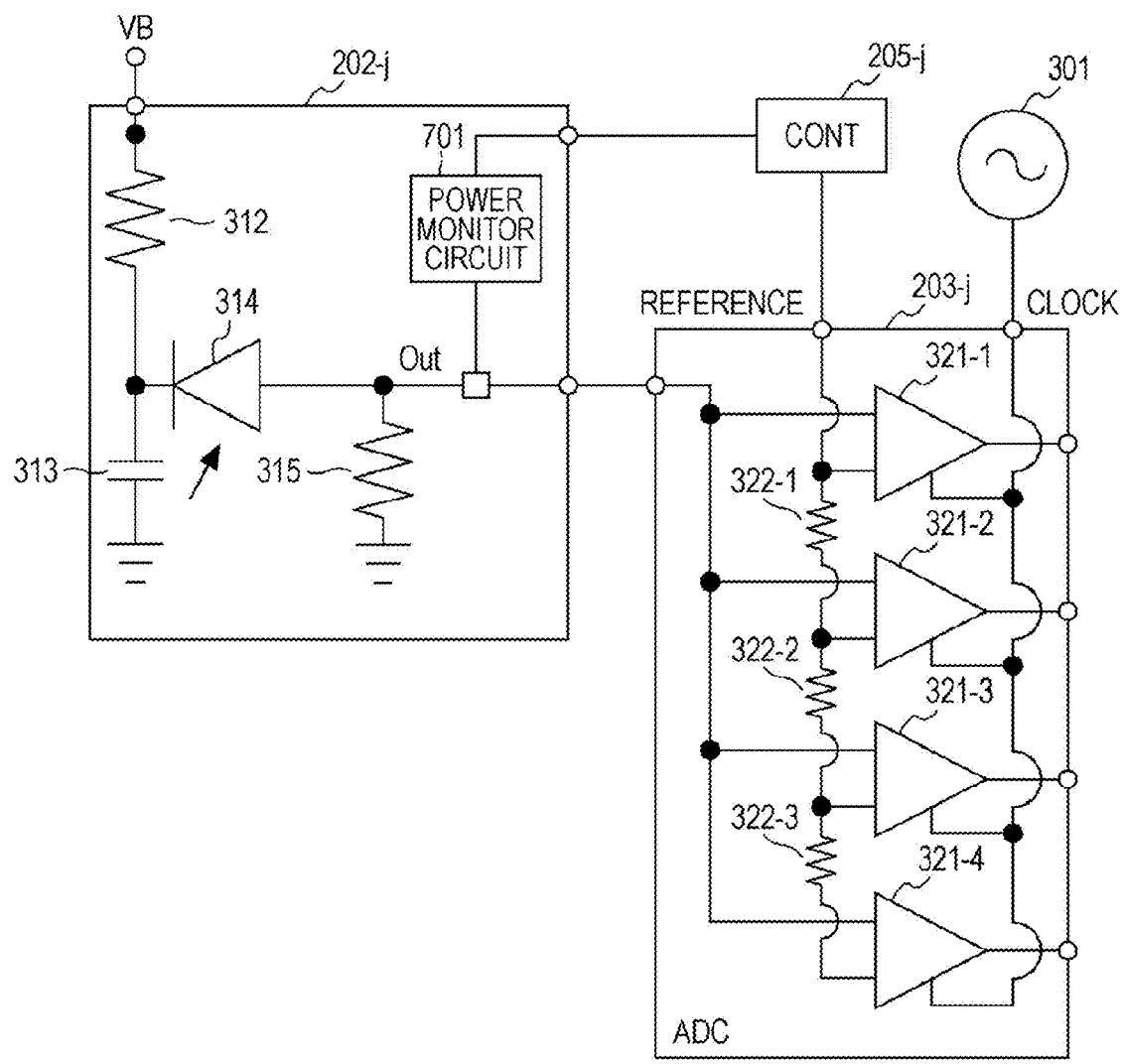
FIG. 7 illustrates another configuration example of a data signal generating circuit.

FIG. 7 illustrates another configuration example in which a power of the analog signal DATA output from the opto-electronic converter 202-j is monitored. The opto-electronic converter 202-j in FIG. 7 has a configuration in which a power monitor circuit 701 is added to the opto-electronic converter 202-j in FIG. 5. The ADC 203-j in FIG. 7 has the same configuration as in FIG. 3. As in the example in FIG. 7, the power monitor circuit 701 may be included in the opto-electronic converter 202-j.

Figure 8:
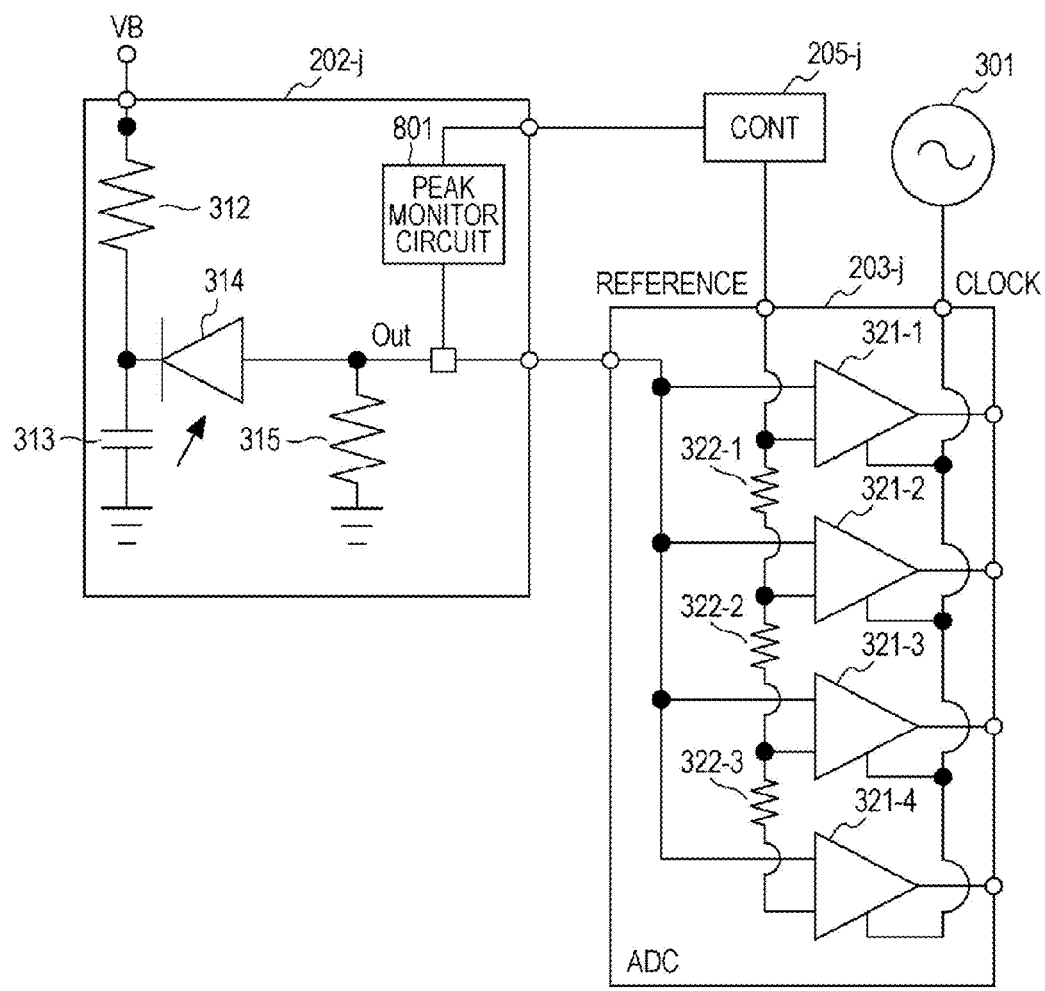
FIG. 8 illustrates a configuration example of a data signal generating circuit.

FIG. 8 illustrates another configuration example in which a peak value of the analog signal DATA output from the opto-electronic converter 202-j is monitored. The opto-electronic converter 202-j in FIG. 8 has a configuration in which a peak monitor circuit 801 is added to the opto-electronic converter 202-j in FIG. 6. The ADC 203-j in FIG. 8 has the same configuration as in FIG. 3. As in the example in FIG. 8, the peak monitor circuit 801 may be included in the opto-electronic converter 202-j.

Figure 9:
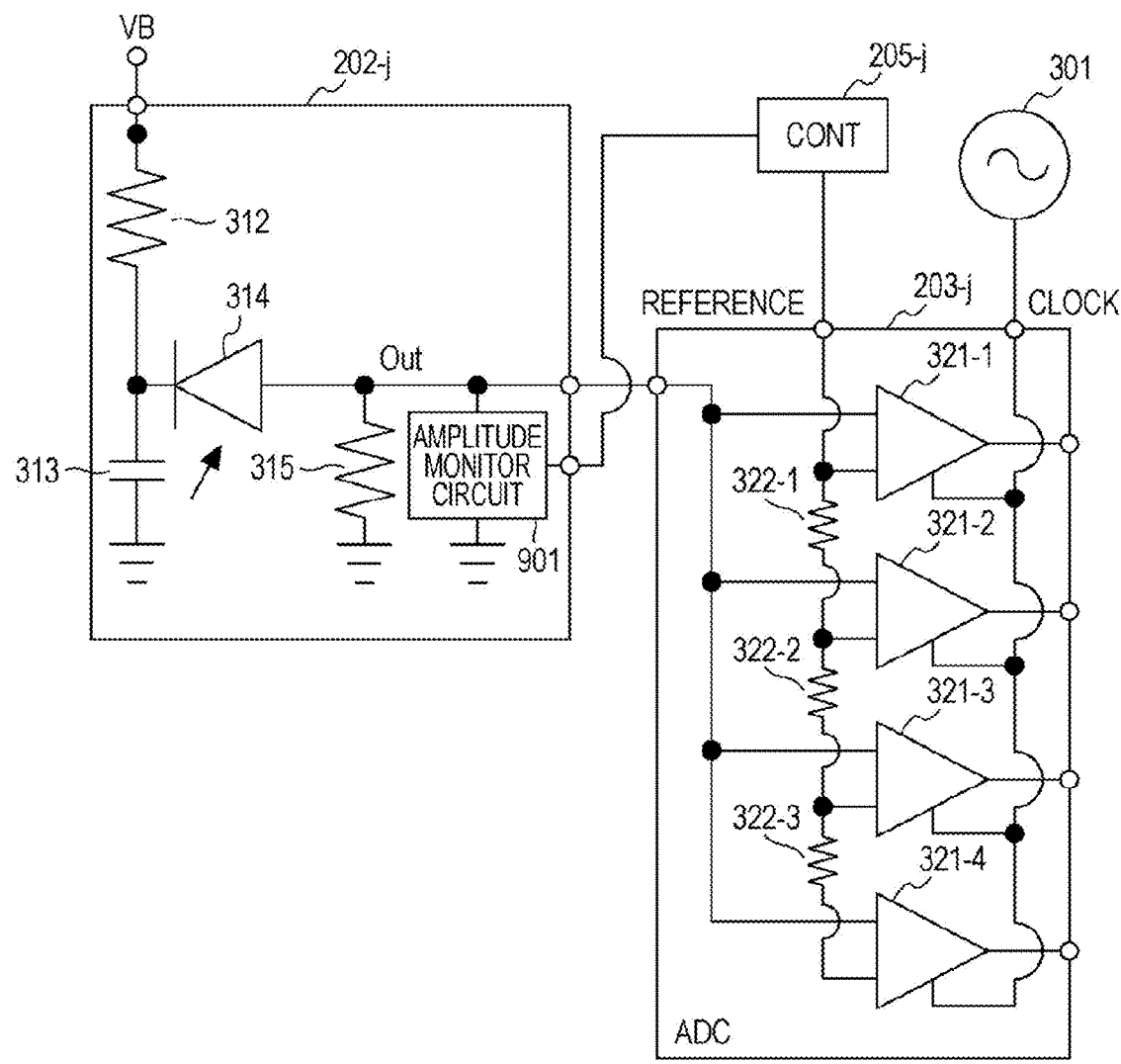
FIG. 9 illustrates another configuration example of a data signal generating circuit.

FIG. 9 illustrates a configuration example in which an amplitude of the analog signal DATA output from the opto-electronic converter 202-j is monitored. The opto-electronic converter 202-j in FIG. 9 has a configuration in which an amplitude monitor circuit 901 is added to the opto-electronic converter 202-j in FIG. 5. The ADC 203-j in FIG. 9 has the same configuration as in FIG. 3.

A first terminal of the amplitude monitor circuit 901 is connected to the output terminal of the opto-electronic converter 202-j, a second terminal thereof is grounded, and a third terminal thereof is connected to the CONT 205-j. The amplitude monitor circuit 901 monitors the amplitude of the analog signal DATA and supplies information about the monitored amplitude to the CONT 205-j.

The CONT 205-j determines the reference voltage REFERENCE based on the received information about the amplitude and applies the reference voltage REFERENCE to the ADC 203-j. For example, the reference voltage REFERENCE is set to a value proportional to the amplitude.

Figure 10:
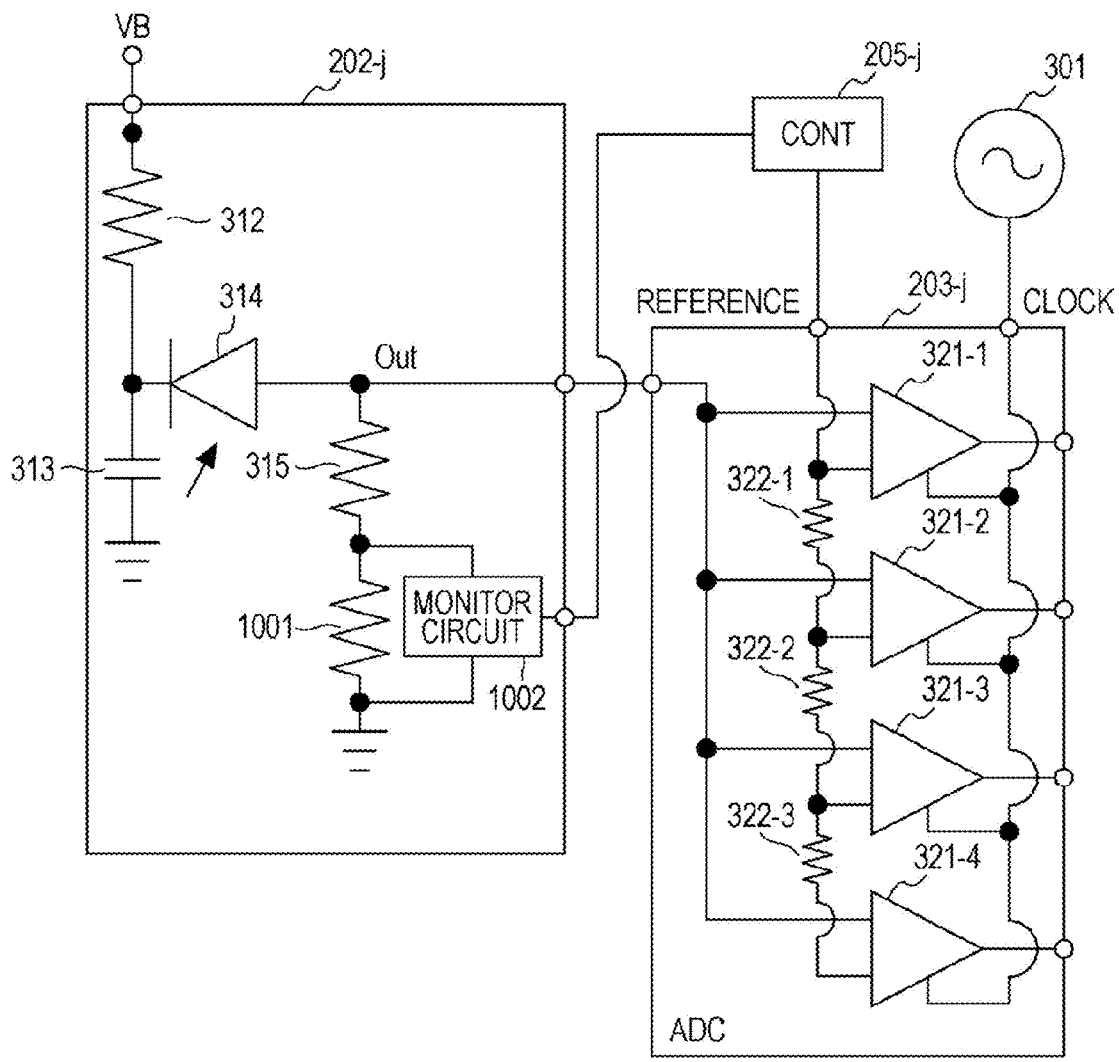
FIG. 10 illustrates a configuration example of a data signal generating circuit.

FIG. 10 illustrates another configuration example in which a current flowing through the opto-electronic converter 202-j is monitored. The opto-electronic converter 202-j in FIG. 10 has a configuration in which the monitor circuit 311 is removed from the opto-electronic converter 202-j in FIG. 3 and a shunt resistor 1001 and a monitor circuit 1002 are added thereto. The ADC 203-j in FIG. 10 has the same configuration as in FIG. 3.

One terminal of the shunt resistor 1001 is connected to the load resistor 315 and the other terminal thereof is grounded. The monitor circuit 1002 is connected between both ends of the shunt resistor 1001. The monitor circuit 1002 monitors the value of a current flowing through the shunt resistor 1001 to monitor the value of a current flowing through the load resistor 315. The monitor circuit 1002 supplies information about the monitored current value to the CONT 205-j.

Figure 11:
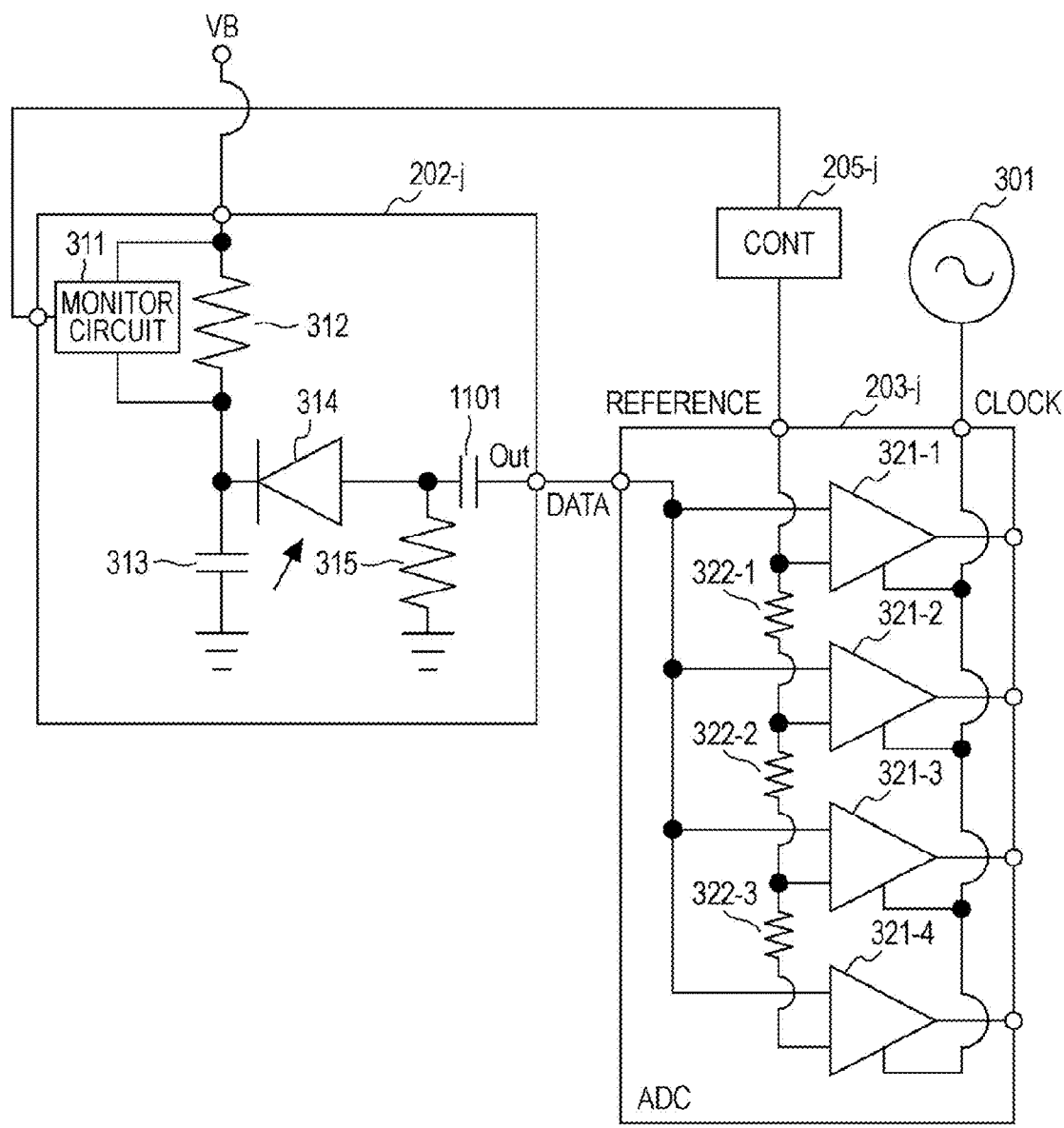
FIG. 11 illustrates another configuration example of a data signal generating circuit.

FIG. 11 illustrates another configuration example in which a current flowing through the opto-electronic converter 202-j is monitored. The opto-electronic converter 202-j in FIG. 11 has a configuration in which a coupling capacitor 1101 is added to the opto-electronic converter 202-j in FIG. 3. The ADC 203-j in FIG. 11 has the same configuration as in FIG. 3.

One terminal of the coupling capacitor 1101 is connected to the anode of the PIN-PD 314 and the other terminal thereof is connected to the output terminal of the opto-electronic converter 202-j. The provision of the coupling capacitor 1101 allows the direct-current component to be removed from the analog signal DATA.

A similar coupling capacitor may be added to the opto-electronic converters 202-j in FIGS. 5 to 10.

Figure 12:
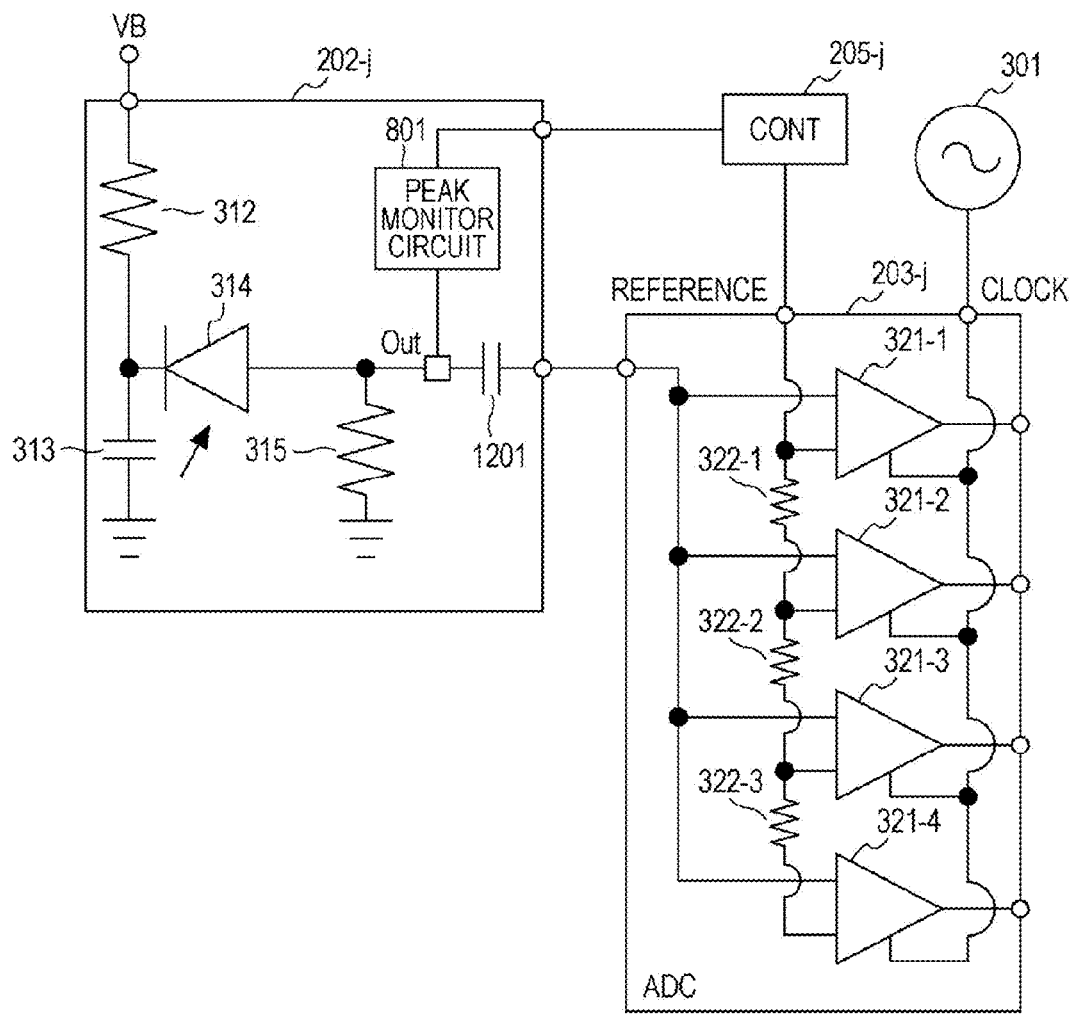
FIG. 12 illustrates a configuration example of a data signal generating circuit.

FIG. 12 illustrates another configuration example in which a peak value of the analog signal DATA output from the opto-electronic converter 202-j is monitored. The opto-electronic converter 202-j in FIG. 12 has a configuration in which a coupling capacitor 1201 is added to the opto-electronic converter 202-j in FIG. 8. The ADC 203-j in FIG. 12 has the same configuration as in FIG. 3.

One terminal of the coupling capacitor 1201 is connected to the anode of the PIN-PD 314 and the other terminal thereof is connected to the output terminal of the opto-electronic converter 202-j. In the example in FIG. 12, the peak monitor circuit 801 is connected between the PIN-PD 314 and the coupling capacitor 1201.

A similar coupling capacitor may be added to the opto-electronic converter 202-j in FIG. 7.

Figure 13:
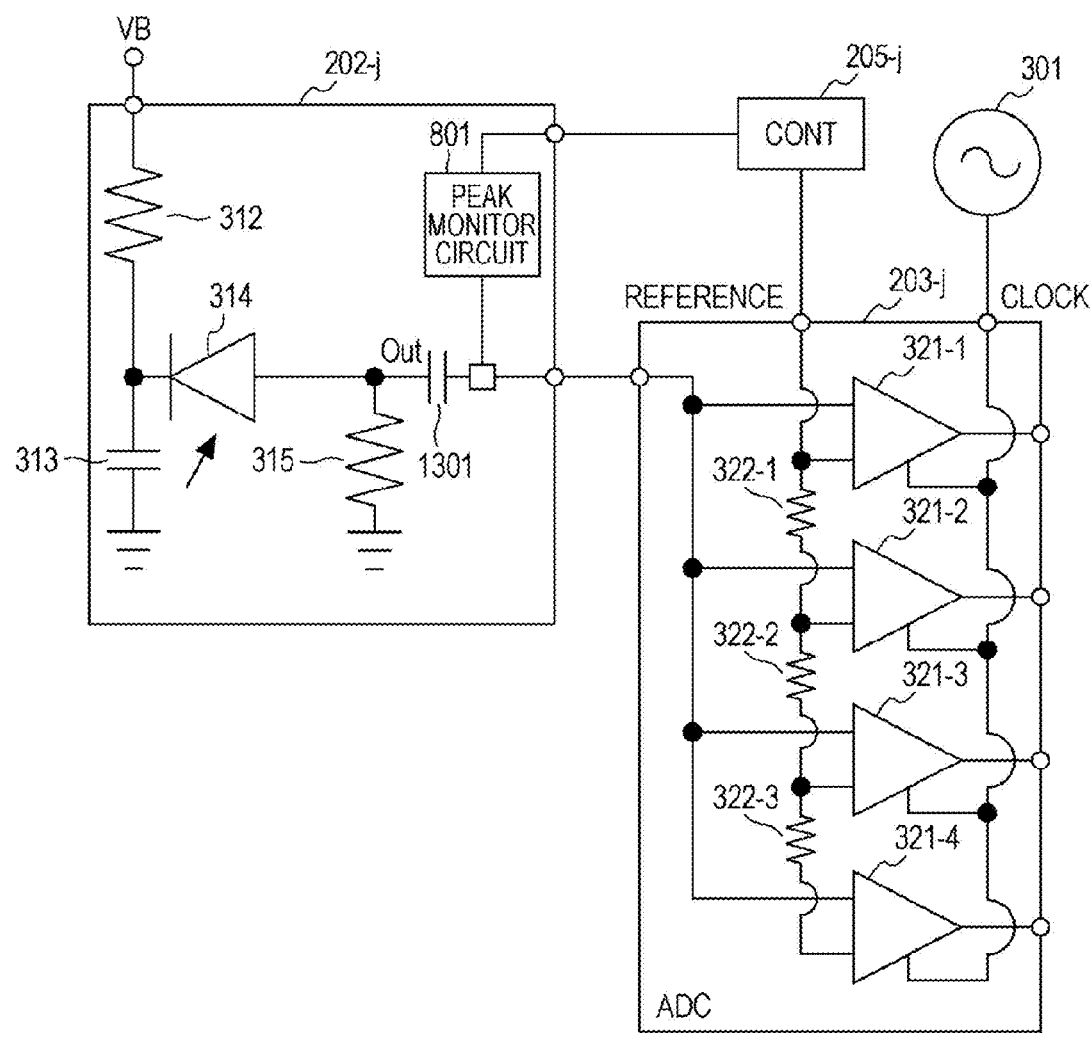
FIG. 13 illustrates another configuration example of a data signal generating circuit.

FIG. 13 illustrates another configuration example in which a peak value of the analog signal DATA output from the opto-electronic converter 202-j is monitored. The opto-electronic converter 202-j in FIG. 13 has a configuration in which a coupling capacitor 1301 is added to the opto-electronic converter 202-j in FIG. 8. The ADC 203-j in FIG. 13 has the same configuration as in FIG. 3.

One terminal of the coupling capacitor 1301 is connected to the anode of the PIN-PD 314 and the other terminal thereof is connected to the output terminal of the opto-electronic converter 202-j. In the example in FIG. 13, the peak monitor circuit 801 is connected between the coupling capacitor 1301 and the output terminal.

A similar coupling capacitor may be added to the opto-electronic converter 202-j in FIG. 7.

Figure 14:
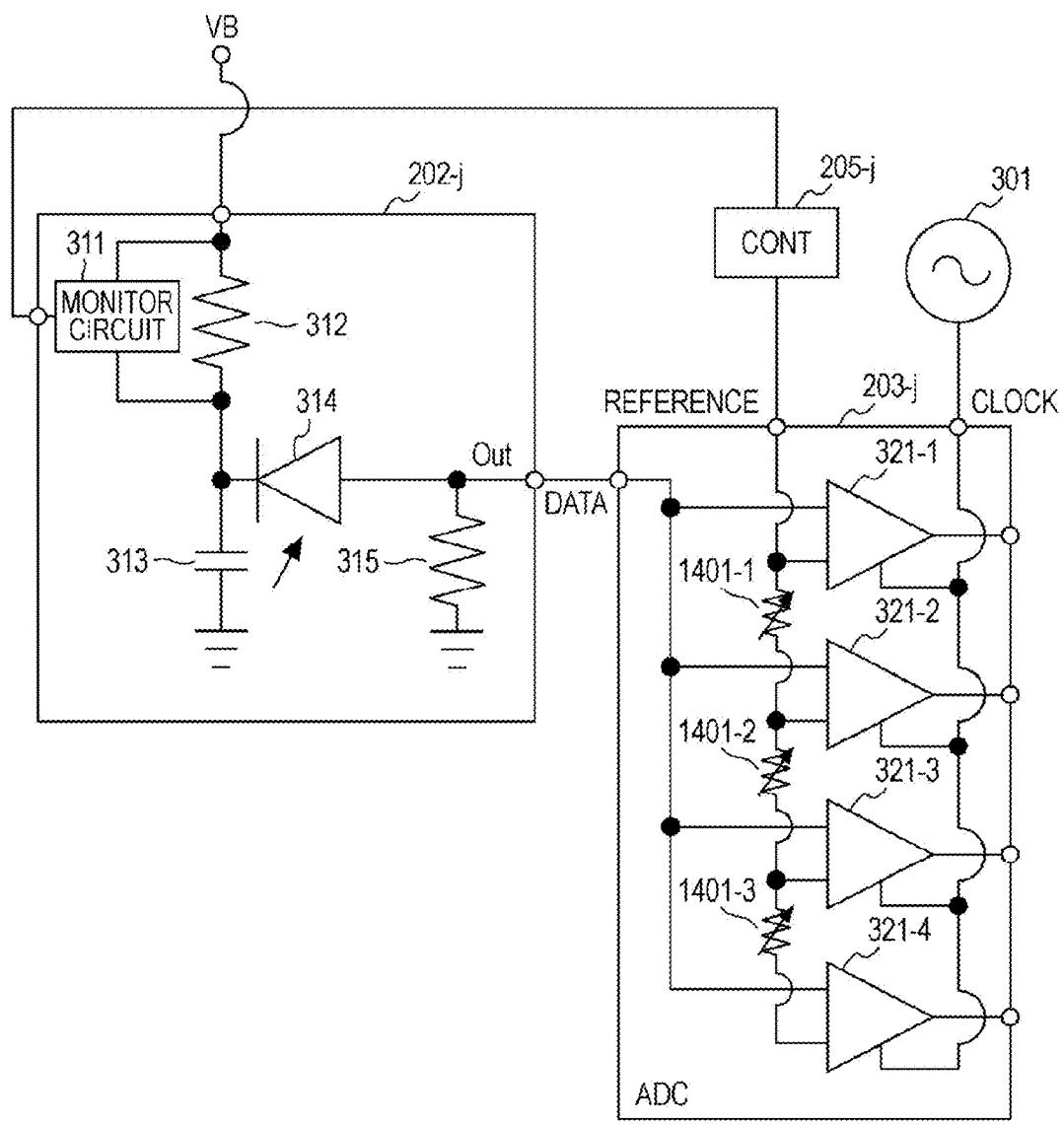
FIG. 14 illustrates a configuration example of a data signal generating circuit.

FIG. 14 illustrates another configuration example of the ADC 203-j. The ADC 203-j in FIG. 14 has a configuration in which the resistors 322-1 to 322-3 are replaced with variable resistors 1401-1 to 1401-3 in the ADC 203-j in FIG. 3.

In the example in FIG. 14, varying the resistances of the variable resistors 1401-1 to 1401-3 allows the respective reference voltages input into the clocked comparators 321-1 to 321-4 to be adjusted.

A similar configuration may be adopted in the ADCs 203-*j* in FIGS. 5 to 13.

Figure 15:
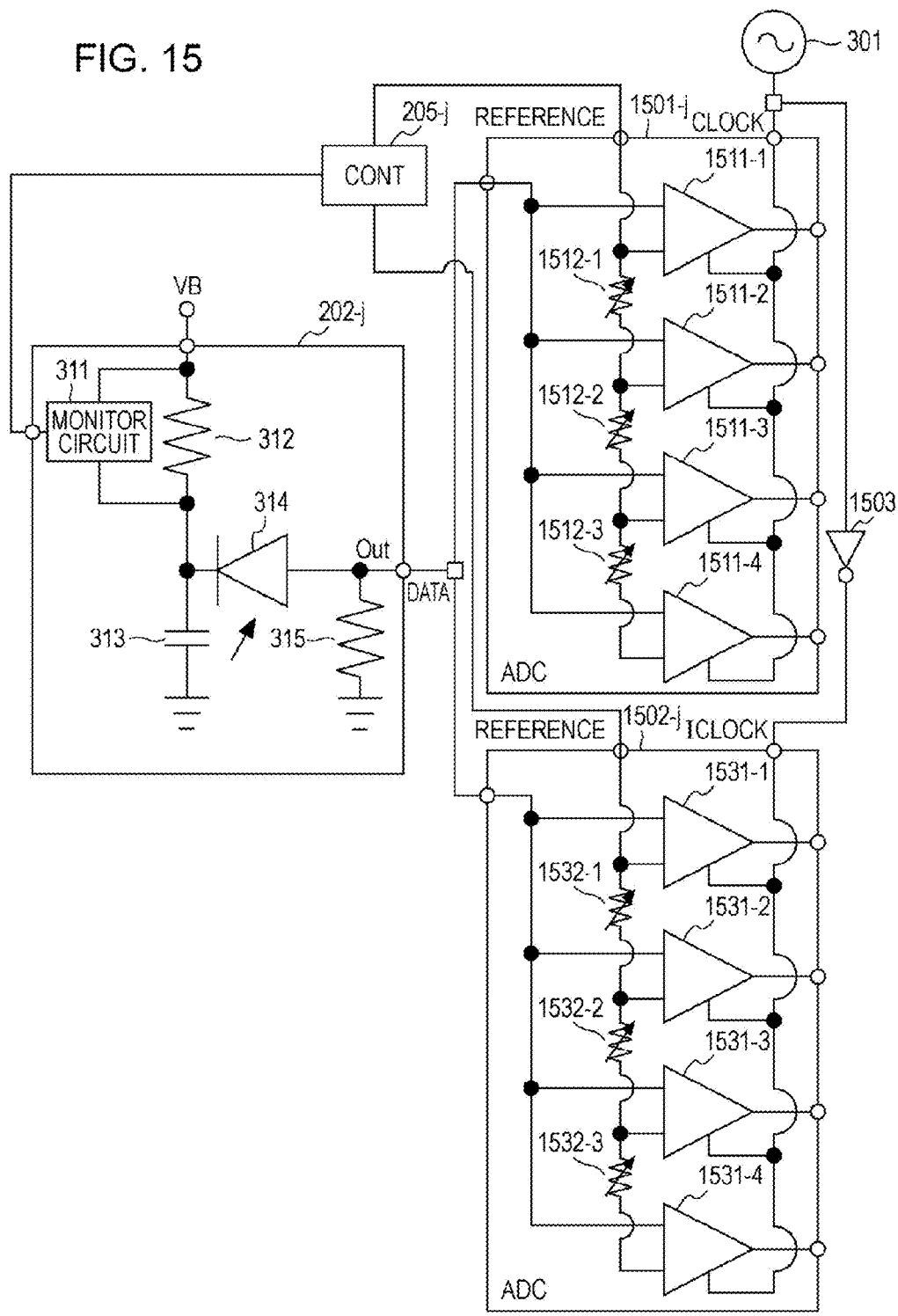
FIG. 15 illustrates another configuration example of a data signal generating circuit.
Figure 16:
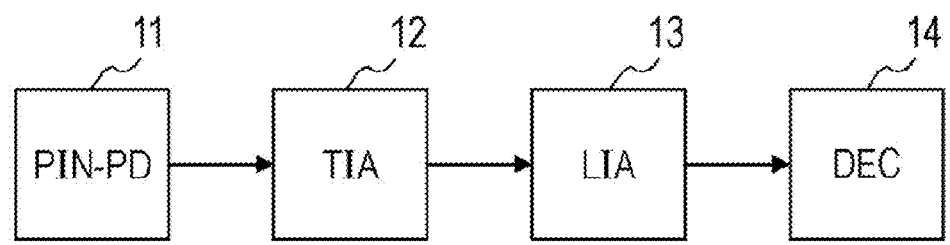
FIG. 16 illustrates a configuration example of a first optical receiver in related art.
Figure 17:
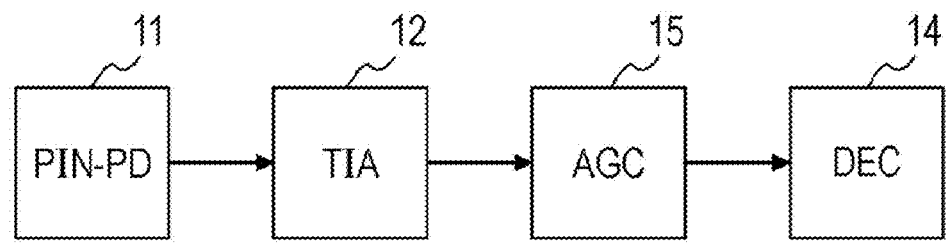
FIG. 17 illustrates a configuration example of a second optical receiver in the related art.

FIG. 15 illustrates a configuration example in which the ADC 203-*j* in FIG. 3 is replaced with two ADC 1501-*j* and 1502-*j*. An inverter 1503 inverts the clock signal CLOCK supplied from the sampling clock source 301 to generate an inverted clock signal ICLOCK.

The ADC 1501-*j* includes clocked comparators 1511-1 to 1511-4 that are arranged in parallel and variable resistors 1512-1 to 1512-3. The ADC 1501-*j* outputs parallel data signals in synchronization with the clock signal CLOCK supplied from the sampling clock source 301.

The ADC 1502-*j* includes clocked comparators 1531-1 to 1531-4 that are arranged in parallel and variable resistors 1532-1 to 1532-3. The ADC 1502-*j* outputs parallel data signals in synchronization with the inverted clock signal ICLOCK supplied from the inverter 1503.

The CONT 205-*j* determines the reference voltage REFERENCE based on information about the current value supplied from the opto-electronic converter 202-*j* and applies the reference voltage REFERENCE to the ADCs 1501-*j* and 1502-*j*.

With the above configuration, the data signals are output in synchronization with both the rising edges and the falling edges of the clock signal CLOCK generated by the sampling clock source 301. Accordingly, it is possible to reduce the frequency of the clock signal CLOCK to a frequency half of the data rate that is required in design.

Fixed resistors may be used instead of the variable resistors 1512-1 to 1512-3 and 1532-1 to 1532-3. In addition, the ADCs 203-*j* in FIGS. 5 to 13 may be replaced with the ADCs 1501-*j* and 1502-*j* in FIG. 15.

Although four clocked comparators are used in the ADCs 203-*j*, 1501-*j*, and 1502-*j* described above with reference to FIG. 3 and FIGS. 5 to 15, a number of the clocked comparators is not restricted to four. In addition, the configuration of the opto-electronic converter 202-*j* is not restricted to those described above with reference to FIG. 3 and FIGS. 5 to 13 and may be varied depending on the specifications of the optical receiver.

According to the optical receiver(es) of the embodiments of the present invention, since the monitor information is varied in accordance with a variation in the electrical signal, it is possible to appropriately vary (or adjust) the reference voltage of the ADC in accordance with the variation in the electrical signal. Accordingly, there is no need to provide the electrical amplifiers, such as the AGC, upstream of the ADC or other similar components, thus reducing the circuit size and the power consumption of the optical receiveres.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus, comprising:
    a first converter configured to convert an optical signal that is received into an electrical signal and output the electrical signal;
    a second converter configured to convert the electrical signal into a digital data signal and output the digital data signal by comparing the electrical signal with a plurality of reference voltages;
    a monitor configured to monitor the electrical signal and output monitored information; and
    a controller configured to control the plurality of reference voltages based on a value indicated by the monitored information.

2. The apparatus according to claim 1, wherein the monitor monitors a current value of the electrical signal and outputs information about the current value as the monitored information.

3. The apparatus according to claim 2, wherein the first converter includes a photodiode and a resistor provided between the photodiode and a bias voltage, and
    wherein the monitor monitors a current value flowing through the resistor and outputs information about the current value as the monitored information.

4. The apparatus according to claim 2, wherein the first converter includes an output terminal for the electrical signal, a load resistor connected to the output terminal, and a shunt resistor connected to the load resistor, and
    wherein the monitor monitors a current value flowing through the shunt resistor and outputs information about the current value as the monitored information.

5. The apparatus according to claim 1, wherein the monitor monitors a power of the electrical signal and outputs information about the power as the monitored information.

6. The apparatus according to claim 1, wherein the monitor monitors a peak value of the electrical signal and outputs information about the peak value as the monitored information.

7. The apparatus according to claim 1, wherein the monitor monitors an amplitude of the electrical signal and outputs information about the amplitude as the monitored information.

8. The apparatus according to claim 1, wherein the second converter includes:
    a first analog-to-digital converter that compares the electrical signal with a reference voltage in synchronization with a clock signal to output a first data signal, and
    a second analog-to-digital converter that compares the electrical signal with a reference voltage in synchronization with an inverted clock signal to output a second data signal.

9. A signal generating circuit, comprising:
    a first converter configured to convert an optical signal that is received into an electrical signal and output the electrical signal;

a second converter configured to convert the electrical signal into a digital data signal and outputs the digital data signal by comparing the electrical signal with a plurality of reference voltages;

a monitor configured to monitor the electrical signal and output monitored information; and a controller configured to control the plurality of reference voltages based on a value indicated by the monitored information.

10. A receiving method for an apparatus, the method comprising:

receiving an optical signal;

converting the optical signal into an electrical signal;

monitoring the electrical signal to acquire monitored information;

controlling a plurality of reference voltages based on a value indicated by the monitored information; and converting the electrical signal into a digital data signal by comparing the electrical signal with the controlled plurality of reference voltages.

11. A method of controlling a circuit, comprising:

outputting monitored information and inputting an electrical signal to be monitored by a monitor;

converting the electrical signal into a digital data signal;

outputting the digital data signal by comparing the electrical signal with a plurality of reference voltages; and controlling a plurality of reference voltages in accordance with a value indicated by the monitored information.

\* \* \* \* \*